United States Patent
Lozano

(10) Patent No.: US 7,852,953 B2
(45) Date of Patent: Dec. 14, 2010

(54) METHOD FOR ALLOCATION OF POWER IN MULTIUSER ORTHOGONAL FREQUENCY DIVISION MULTIPLEXING

(75) Inventor: Angel Lozano, Hoboken, NJ (US)

(73) Assignee: Alcatel-Lucent USA, Murray Hill, NJ (US)

( * ) Notice: Subject to any disclaimer, the term of this patent is extended or adjusted under 35 U.S.C. 154(b) by 1289 days.

(21) Appl. No.: 11/393,307

(22) Filed: Mar. 30, 2006

(65) Prior Publication Data

US 2007/0230589 A1   Oct. 4, 2007

(51) Int. Cl.
*H04K 1/10* (2006.01)
*H04L 27/28* (2006.01)

(52) U.S. Cl. .................. 375/260; 375/299; 375/340; 375/220

(58) Field of Classification Search ............... 375/260, 375/267, 316, 355, 367
See application file for complete search history.

(56) References Cited

U.S. PATENT DOCUMENTS

| | | | |
|---|---|---|---|
| 6,134,274 A * | 10/2000 | Sankaranarayanan et al. | 375/295 |
| 7,139,321 B2 * | 11/2006 | Giannakis et al. | 375/260 |
| 7,327,795 B2 * | 2/2008 | Oprea | 375/260 |
| 2002/0114400 A1 * | 8/2002 | Bombay | 375/260 |
| 2005/0152466 A1 * | 7/2005 | Maltsev et al. | 375/260 |
| 2006/0203891 A1 * | 9/2006 | Sampath et al. | 375/132 |
| 2007/0025460 A1 * | 2/2007 | Budianu et al. | 375/260 |

OTHER PUBLICATIONS

"Numerical Recipes in C: The Art of Scientific Computing", ISBN 0-521-43108-5, © 1988-1992 by Cambridge University Press, pp. 383-393.
D. Guo, S. Shamai, and S. Verdu, "Mutual Information and Minimum Mean-Square Error in Gaussian Channels" IEEE Transactions on Information Theory, vol. 51, No. 4, Apr. 2005, pp. 1261-1282.
Shannon, Claude E., Communication in the Presence of Noise, Proceedings of the IRE, vol. 37, No. 1, pp. 10-21, Jan. 1949, Reprinted in the Proceedings of the IEEE, vol. 86, No. 2, Feb. 1998, pp. 447-457.

* cited by examiner

*Primary Examiner*—Shuwang Liu
*Assistant Examiner*—Qutbuddin Ghulamali
(74) *Attorney, Agent, or Firm*—Priest & Goldstein, PLLC

(57) ABSTRACT

Power allocation methods for multiuser orthogonal frequency division multiplexing (OFDM) are described. Arbitrary partitioning of the OFDM tones among users and arbitrary modulation formats, possibly different for every user, are considered. Two systems of receivers and transmitters and corresponding methods address power allocation, respectively for slow fading channels tracked instantaneously by the system and for fast fading channels known only statistically thereby.

20 Claims, 3 Drawing Sheets

METHOD FOR ALLOCATION OF POWER IN MULTIUSER ORTHOGONAL FREQUENCY DIVISION MULTIPLEXING

FIELD OF INVENTION

The present invention relates generally to methods and apparatus for power allocation in wireless communication systems, and in particular to methods and apparatus for power allocation in orthogonal frequency division multiplexing (OFDM) wireless communication systems for slow fading and fast fading channels. In addition, the described methods and apparatus are applicable to other scenarios where communication between a transmitter and multiple receivers take place on orthogonal channels over which an average power constraint exists.

BACKGROUND OF INVENTION

A typical scenario encountered in wireless communication is that of a transmitting access point wanting to communicate simultaneously with J receiving user terminals over a downlink channel. In order to accommodate simultaneous communication with the J users, whose needs and channel conditions may be very different, the resources of bandwidth and power available for communication must be rationally divided. An efficient and increasingly preferred way of dividing the bandwidth is by means of orthogonal frequency division multiplexing (OFDM), whereby the bandwidth is partitioned into a large number of narrow orthogonal tones. Each user is assigned several, possibly nonadjacent, tones. Each tone is assigned to only one user and hence the signals transmitted to the J users remain orthogonal.

Once the tones have been assigned, the available power to be transmitted has to be allocated. Diverse optimality criteria can be used in order to decide which fraction of the available power is allocated to each of the tones. The most fundamental criterion is the maximization of the region of simultaneous mutual informations, which specifies the set of simultaneous user spectral efficiencies that can be achieved reliably. For ideal Gaussian signals, the power allocation that maximizes the region of simultaneous mutual informations is known to be a form of waterfilling. In practice, however, ideal Gaussian signals cannot be realized. Rather, the signals are modulated using discrete constellations for which an optimum power allocation has not been formulated.

SUMMARY OF INVENTION

Among its several aspects, the present invention recognizes that there is a need for improved power allocation methods and apparatus that maximize the region of simultaneous mutual informations in multiuser OFDM with arbitrary signaling formats. The present invention recognizes that it is desirable to have power allocation methods and apparatus for slow fading channels that are tracked instantaneously by the transmitting access point. It also recognizes that it is desirable to have power allocation methods and apparatus for fast fading channels that are known only statistically at the transmitting access point.

An embodiment of the present invention includes an apparatus for allocating transmission power among a plurality of users in an orthogonal frequency division multiplexing (OFDM) wireless communication system. A receiver receives transmissions and provides channel and noise estimates which fit a zero-mean complex Gaussian random process. A processor receives the channel and noise estimates, assigns tones and priorities, and generates a channel state for each tone, where the channel state is related to a complex gain value representing a fading state of the corresponding tone divided by a noise estimate for the corresponding tone, and allocates power to tones whose channel state is above a threshold, wherein the threshold is directly proportional to a bandwidth fraction assigned to a corresponding user and inversely proportional to the priority assigned to the corresponding user.

Another embodiment of the present invention addresses a method for allocating transmission power among a plurality of users in an orthogonal frequency division multiplexing (OFDM) wireless communication system. Channel and noise estimates are received where the noise estimates fit a zero-mean complex Gaussian random process. A channel state for each tone is generated where the channel state is related to a complex gain value representing a fading state of the corresponding tone divided by a noise estimate for the corresponding tone. Power is allocated to tones whose channel state is above a threshold, wherein the threshold is directly proportional to a bandwidth fraction assigned to a corresponding user and inversely proportional to the priority assigned to the corresponding user.

A further embodiment of the present invention addresses a computer-readable medium having a program for allocating transmission power among a plurality of users in an orthogonal frequency division multiplexing (OFDM) wireless communication system. Channel and noise estimates are received where the noise estimates fit a zero-mean complex Gaussian random process. A channel state for each tone is generated where the channel state is related to a complex gain value representing a fading state of the corresponding tone divided by a noise estimate for the corresponding tone. Power is allocated to tones whose channel state is above a threshold, wherein the threshold is directly proportional to a bandwidth fraction assigned to a corresponding user and inversely proportional to the priority assigned to the corresponding user.

A more complete understanding of the present invention, as well as other features and advantages of the invention, will be apparent from the following detailed description, the accompanying drawings, and the claims.

DETAILED DESCRIPTION

The present invention will now be described more fully with reference to the accompanying drawings, in which several embodiments and various aspects of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Figure 1:
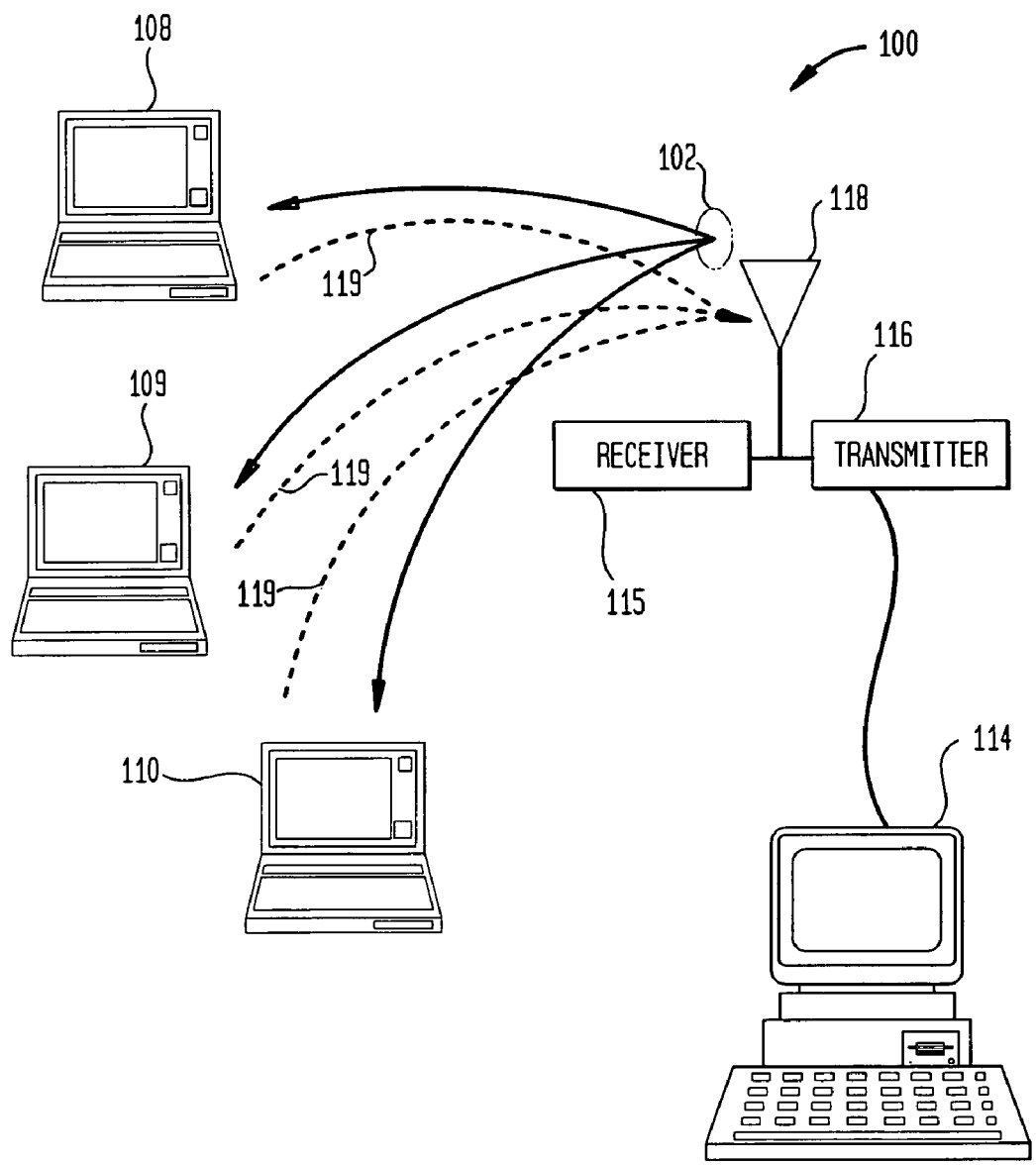
FIG. 1 illustrates a wireless communication system with a highlighted downlink channel to three user devices utilizing power allocation in accordance with the present invention.

FIG. 1 illustrates a wireless communication system 100 with a highlighted downlink channel 102 to three user devices 108-110 utilizing power allocation in accordance with the present invention. The system 100 includes a processor 114 having an internal memory and storage facilities for a program for power allocation and for data storage. The system 100 also includes a receiver 115, a transmitter 116, and a transmission antenna 118. The processor 114 operates, using programming methods and programs which may suitably be stored on various forms of media, to allocate transmission power among the three users, in this example. Various programming languages, compilers, operating systems and processors may be used for allocating power as described in further detail below. The program for power allocation may be stored as electronic media in the processor 114 on a high density disk drive, an optical disk drive, or the like. The program as a computer-readable medium may also be downloaded over a communication network from a remote network device, such as a server or mass storage unit.

Three user devices are shown for illustrative purposes only. The present invention applies equally well to systems having an arbitrary number of user devices. User devices may take the form of wireless portable and stationary devices, such as cell phones, personal data assistants (PDAs), notebook computers, and personal computers. For a communication system with J users, the problem of power allocation is described using a baseband representation, where the various quantities are, in general, complex with the real and imaginary parts indicating the in-phase and quadrature components, respectively. Further details of the receiver 115 and the transmitter 116 are provided below.

In an OFDM wireless communication system, such as system 100, a downlink channel is partitioned into n orthogonal tones, sized in width such that each tone experiences approximately frequency-flat fading. With either a single transmit antenna or a beam forming array, a scalar signal may be transmitted on every tone. The J users being served are each equipped with an arbitrary number of antennas. Communication with the users entails the transmission of frames, each of which are a sequence of coded blocks of data. For each such frame, a higher-layer scheduler, operating in processor 114, assigns each tone to one of the users, determines the signaling constellation to be used by each user on its assigned tones, and establishes user priorities from the non-negative set $\{w_j\}$ such that:

$$\sum_{j=1}^{J} w_j = 1 \qquad \text{Equation 1}$$

Among its several aspects, the present invention teaches methods and apparatus for allocating power for any arbitrary assignment of tones, constellations and priorities. The channel characteristics will in general change from frame to frame. Under slow fading, the channel characteristics remain approximately constant within each frame whereas, under fast fading, they can also change within each frame.

Denoting by $n_j$ the number of tones assigned to user j, the input-output relationship on the ith tone of the jth user at time k is:

$$Y_j(k) = h_{i,j}(k) S_{i,j}(k) + W_{i,j}(k) \quad j=1, \ldots, J \qquad \text{Equation 2}$$

where $h_{i,j}(k)$ is a complex gain representing the fading state of the tone while noise $W_{i,j}(k)$ is a zero-mean $\sigma^2_{i,j}$-variance complex Gaussian random process that is independent of the noise on the other tones. The complex signals $S_{i,j}(k)$ are stationary and ergodic random processes whose distributions are dictated by the modulation schemes used by the corresponding users, with powers:

$$p_{i,j} = E[|S_{i,j}(k)|^2] \qquad \text{Equation 3}$$

where $E[\cdot]$ is an expectation operator. Equation 3 satisfies an average power constraint of the form:

$$\frac{1}{n} \sum_{i=1}^{n_j} \sum_{j=1}^{J} p_{i,j} \leq P \qquad \text{Equation 4}$$

where P is the maximum power that can be supplied by a transmitter, such as transmitter 116, divided by the number of tones n. Noting that the tones assigned to a given user may be nonadjacent, $\beta_j$ is defined:

$$\beta_j = \frac{n_j}{n} \qquad \text{Equation 5}$$

as the fraction of the total bandwidth assigned to user j.

A channel state $\gamma_{i,j}(k)$ for each tone is defined as:

$$\gamma_{i,j}(k) = \frac{|h_{i,j}(k)|^2}{\sigma^2_{i,j}} \qquad \text{Equation 6}$$

and, for every tone assigned to user j, $$E[\gamma_{i,j}(k)] = \bar{\gamma}_j \quad i=1, \ldots, n_j \qquad \text{Equation 7}$$

where $\bar{\gamma}_j$ is a measure of the local-average signal-to-noise ratio at the location occupied by user j and $\bar{\gamma}_j$ represents an average channel state for user j.

Two distinct scenarios are described below, where each scenario is associated with a level of channel state information at the transmitter (CSIT). In a first scenario, a transmitter can track the fading states and thus this scenario is associated with instantaneous CSIT. If the system is time duplexed, then the system can take advantage of the fact that the fading in the forward and reverse transmissions is reciprocal and thus the access point can learn the channel while acting as a receiver and then use this knowledge upon transmission. If the system is frequency duplexed, then there is no reciprocity between the forward and reverse transmissions and the access point must rely on feedback. In this latter case, the instantaneous CSIT scenario is a valid model for slowly fading channels that allow for timely feedback, such as, those channels associated with fixed broadband access and pedestrian traffic.

In a second scenario, the fading states cannot be tracked by a transmitter, which is only privy to their statistical distribution. The CSIT is thus statistical. This scenario is a satisfactory model for fast fading channels, such as, those channels associated with vehicular traffic. Note that the statistical distributions are reciprocal and thus feedback is not required in this scenario regardless of the type of duplexing.

A step in the power allocation method of the present invention is the minimum mean-square error (MMSE) incurred in the estimation of the signals $\{S_{i,j}(k)\}$. The estimate of each $S_{i,j}(k)$ that minimizes the corresponding mean-square error is known to be the conditional mean estimator as discussed in "Mutual Information and Minimum Mean-Square Error in Gaussian Channels" by D. Guo, S. Shamai, and S. Verdu, IEEE Transactions on Information Theory, Vol. 51, No. 4, April 2005, pp. 1261-1282 which is incorporated by reference herein in its entirety. Thus, $$\hat{S}_{i,j}(k) = E[S_{i,j}(k)Y_{i,j}(k)] \qquad \text{Equation 8}$$

which is, in general, a nonlinear estimator where the symbol | means conditional. For a discrete constellation with m equiprobable points denoted $\{s_1, \ldots, s_m\}$, for example, $$\hat{S}_{i,j}(k) = \frac{\sum_{l=1}^{m} s_l e^{-|Y_{i,j}(k) - \sqrt{p_{i,j}\gamma_{i,j}} s_l|^2}}{\sum_{l=1}^{m} s_l e^{-|Y_{i,j}(k) - \sqrt{p_{i,j}\gamma_{i,j}} s_l|^2}} \qquad \text{Equation 9}$$

The MMSE on the ith tone of the jth user is then:

$$MMSE_j(p_{i,j}\gamma_{i,j}) = E[|S_{i,j}(k) - \hat{S}_{i,j}(k)|^2] \qquad \text{Equation 10}$$

which is a function of the product $p_{i,j}\gamma_{i,j}$. The inverse of $MMSE_j$ with respect to the composition of functions is denoted by $MMSE_j^{-1}$. These $MMSE_j$ and $MMSE_j^{-1}$ functions can be tabulated and stored in memory in processor 114 for every constellation of interest. The value of j, as a user index, maps onto the specific constellation being used by that user.

In the first scenario, with instantaneous CSIT available, the channel states $\{\gamma_{i,j}(k)\}$ vary slowly and are known by the transmitter 116. Within each frame, the channel states remain approximately constant and thus, the time index k is dropped out. The value of $\{\gamma_{i,j}\}$, in combination with the tone assignments and the priorities $\{w_j\}$, gives rise to a J-dimensional region containing all feasible vectors $[R_1, \ldots, R_J]$ where $R_j$ is the mutual information achieved by user j on its assigned tones.

With instantaneous CSIT, the unique power allocation that maximizes the region of simultaneously achievable mutual informations, which is the region containing all the feasible vectors, can be expressed parametrically as:

$$p_{i,j} = 0 \qquad \gamma_{i,j} \leq \frac{\beta_j}{w_j}\eta \qquad \text{Equation 11}$$
$$p_{i,j} = \frac{1}{\gamma_{i,j}} MMSE_j^{-1}\left(\frac{\beta_j \eta}{w_j \gamma_{i,j}}\right) \qquad \gamma_{i,j} > \frac{\beta_j}{w_j}\eta$$

with the parameter $\eta$ such that $$\frac{1}{n}\sum_{i=1}^{n_j}\sum_{j=1}^{j} p_{i,j} = P \qquad \text{Equation 12}$$

Equations 11 and 12 may be interpreted as follows: no power is allocated to those tones whose channel state is below or equal to a threshold, $(\beta_j/w_j)\eta$, which is directly proportional to the bandwidth fraction $\beta_j$ of the corresponding user and inversely proportional to its priority $w_j$. Active tones, whose channel state is above the threshold $(\beta_j/w_j)\eta$, are allocated the amount of power needed to render $\gamma_{i,j}MMSE_j(p_{i,j}\gamma_{i,j})$ equal to that threshold.

Thus, the power allocation can be framed as a two-step process:

1. Solve for the parameter $\eta$ by imposing equations 11 and 12 and solving the resulting nonlinear equation:

$$\sum_{i=1}^{n_j}\sum_{j=1}^{j} \frac{1}{n\gamma_{i,j}} MMSE_j^{-1}\left(\min\left\{1, \frac{\beta_j \eta}{w_j \gamma_{i,j}}\right\}\right) = P \qquad \text{Equation 13}$$

2. Use $\eta$ to determine $p_{i,j}$ via equations 11 and 12.

This two step process may be performed within a processor located at the transmitter, such as processor 114, which would take as input the sets $\{\gamma_{i,j}\}$, $\{n_j\}$ and $\{w_j\}$ and produce the set $\{p_{i,j}\}$.

Figure 2:
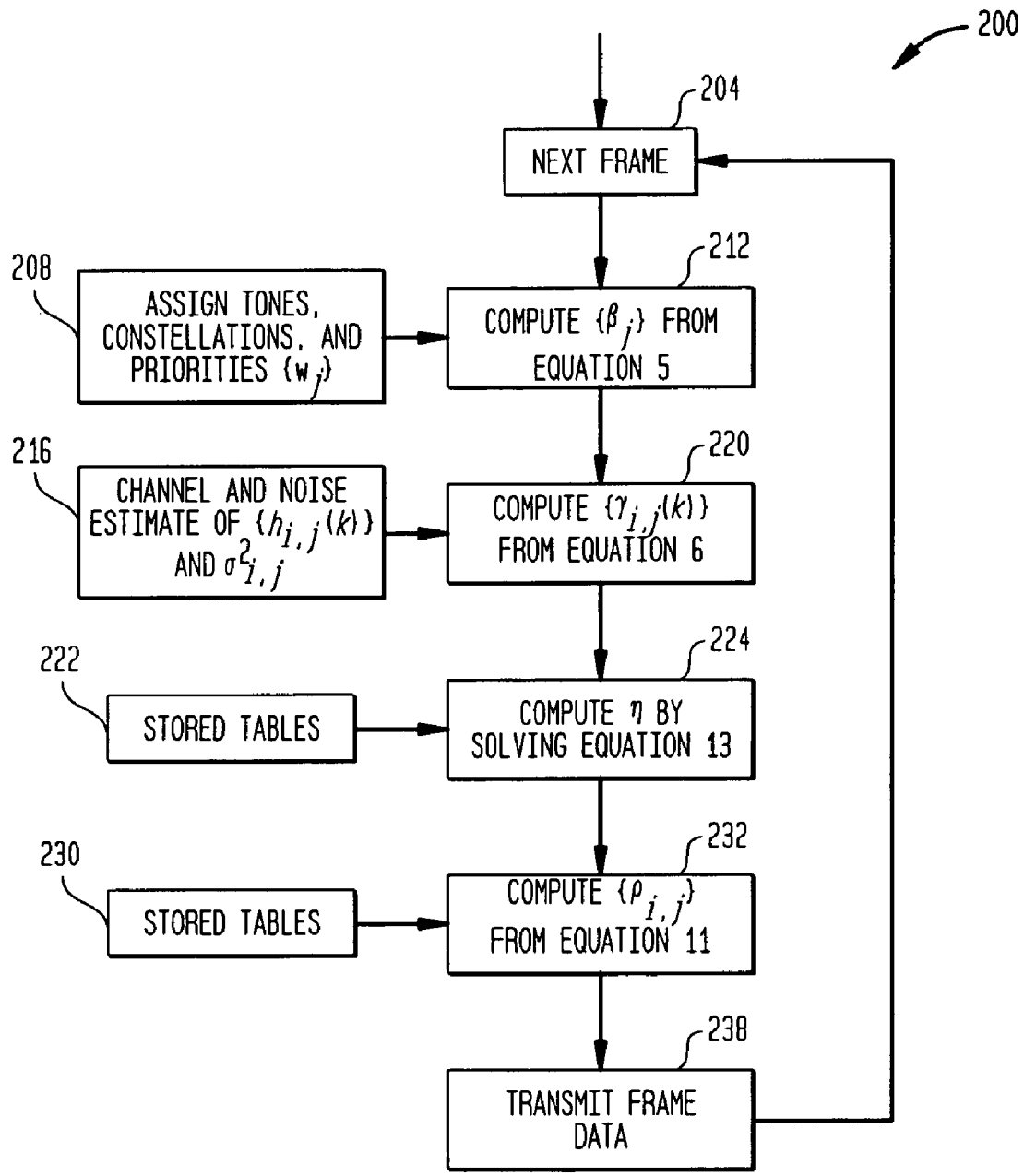
FIG. 2 illustrates an advantageous method for power allocation for slow fading channels with instantaneous channel state information at the transmitter (CSIT) in accordance with the present invention.

FIG. 2 illustrates an advantageous method 200 for power allocation for slow fading channels with instantaneous CSIT in accordance with the present invention. A processor located at the transmitter, such as processor 114, is used to compute the various functions and variables of method 200. Method 200 begins with a frame 204 to be processed. In step 208, a scheduler program in processor 114 operates to assign tones, constellations, and priorities $\{w_j\}$ for the current frame 204 as input to the computation of step 212. In step 212, the processor 114 computes $\{\beta_j\}$ from equation 5.

In step 216, the complex gains representing the fading states $\{h_{i,j}(k)\}$ and the $\{\sigma^2_{i,j}\}$ variances are estimated from a channel and noise estimator program as input to the computation of step 220. In step 220, the processor 114 computes $\{\gamma_{i,j}\}$ from equation 6. The channel and noise estimator program providing those estimates may be operated in processor 114 with information received through reciprocity at the access point, which learns the channel characteristics while also acting as a receiver. Alternatively, the channel and noise estimator program may be operated at the user devices, such as devices 108-110, and connected with the processor 114 via feedback links to receiver 115, such as feedback links 119 of FIG. 1. The former embodiment is preferred in time-duplexed systems while the latter is preferred in frequency-duplexed systems.

In step 222, stored tables of $MMSE^{-1}$ functions are selected and provided as input to step 224 which computes $\eta$ by solving equation 13. The $MMSE^{-1}$ functions can also be computed in real time using equation 10.

In step 230, stored tables of $MMSE^{-1}$ functions are selected and provided as input to step 232 which computes the set $\{p_{i,j}\}$ from equation 11.

In step 238, the frame data is transmitted by a transmitter, such as transmitter 116 of FIG. 1, at the calculated power. The process 200 then repeats with the next frame 204.

In the second scenario with statistical CSIT available, the channel states vary within each frame but the transmitter is only privy to the statistical distributions of the channel states and, therefore, the power allocation cannot be a function of $\{\gamma_{i,j}(k)\}$ but only of their distributions. Since the fading distribution is identical on tones assigned to a given user, the constellation format should naturally be identical on those tones and the powers allocated to those tones should be equal. Thus the tone index can be dropped from the power allocation equations and simply use $\bar{p}_j$, $j=1, \ldots, J$, to denote the power allocation.

The performance measure is the J-dimensional region containing the feasible vectors $[\bar{R}_1, \ldots, \bar{R}_J]$, where $\bar{R}_j$ is the average mutual information achieved by user j on its assigned tones. The power allocation that maximizes this region is characterized by the following set of necessary and sufficient conditions:

$$\overline{p}_j = 0 \qquad \overline{\gamma}_j \leq \frac{\beta_j}{w_j}\eta \qquad \text{Equation 14}$$

$$E[\gamma_{i,j}(k) MMSE_j(\overline{p}_j\gamma_{i,j}(k))] = \frac{\beta_j}{w_j}\eta \quad \overline{\gamma}_j > \frac{\beta_j}{w_j}\eta$$

where the expectation is over the distribution of $\gamma_{i,j}(k)$, $\overline{\gamma}_j$ is the average channel state for user j, and where the parameter $\eta$ is such that $$\sum_{j=1}^{J} \beta_j \overline{p}_j = P \qquad \text{Equation 15}$$

which is equivalent to Equation 4 under statistical CSIT.

The strategy with statistical CSIT is thus as follows: allocate no power to the tones assigned to users whose average channel state is below or equal to a threshold, $(\beta_j/w_j)\eta$, which is directly proportional to the bandwidth fraction $\beta_j$ of the corresponding user and inversely proportional to its priority $w_j$. Active tones, whose channel state is above the threshold $(\beta_j/w_j)\eta$, are allocated the amount of power needed to equalize $E[\gamma_{i,j}(k) MMSE_j(\overline{p}_j\gamma_{i,j}(k))]$ at that threshold.

Computationally, finding $\overline{p}_j$ involves solving a system of J nonlinear equations. This computation can be made using Broyden's method, for example, as described in "Numerical Recipes in C: The Art of Scientific Computing", ISBN 0-521-43108-5,® 1988-1992 by Cambridge University Press, pages 383-393 (Broyden) which is incorporated by reference herein in its entirety. This computation is performed within a processor located at the transmitter, such as processor 114, which would take as inputs the sets $\{\overline{\gamma}_j\}$, $\{n_j\}$ and $\{w_j\}$ and produce the set $\{\overline{p}_j\}$ as an output.

Figure 3:
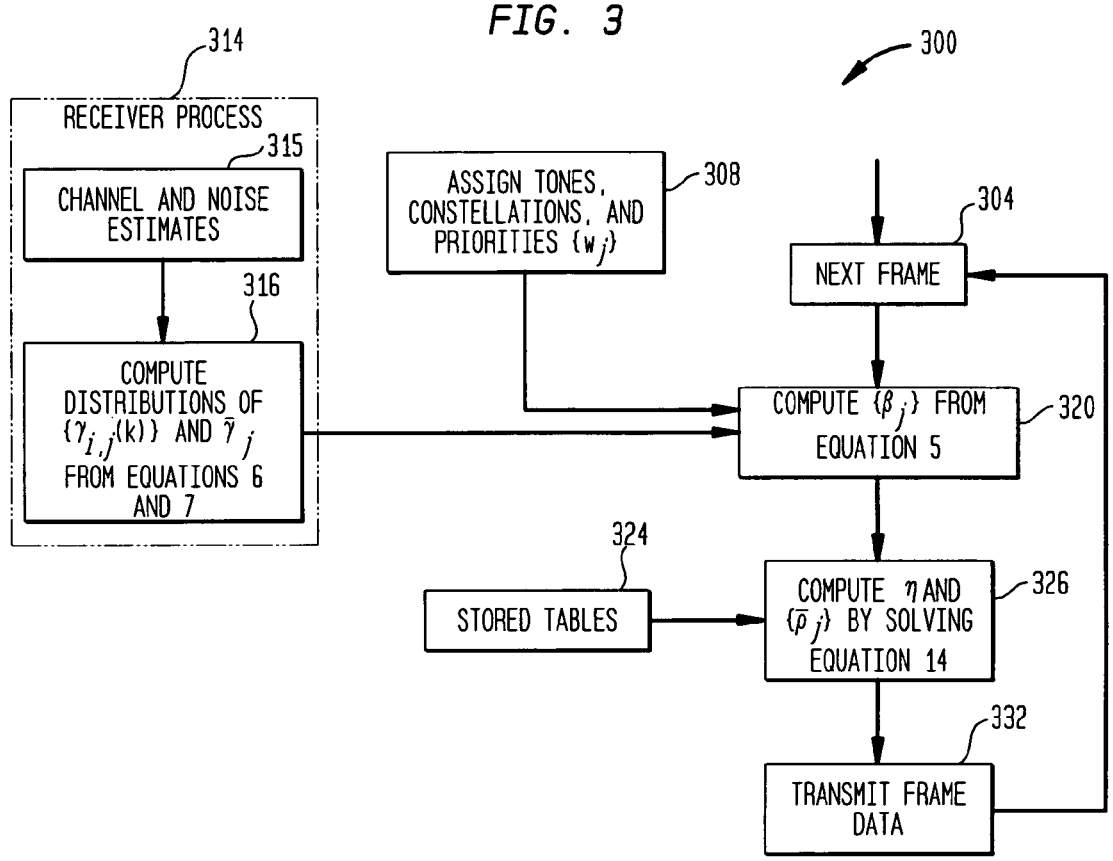
FIG. 3 illustrates an advantageous method for power allocation for fast fading channels with statistical CSIT in accordance with the present invention.

FIG. 3 illustrates an advantageous method 300 for power allocation for fast fading channels with statistical CSIT in accordance with the present invention. A processor located at the transmitter, such as processor 114, is used to compute the various functions and variables of method 300. Method 300 begins with a frame 304 to be processed. In step 308, a scheduler program executed by processor 114 operates to assign tones, constellations, and priorities $\{w_j\}$ for the current frame 304 as an input to step 320.

A receiver process 314, which may suitably be employed in the receiver 115 of FIG. 1, generates or receives through feedback links the channel and noise estimates in step 315. The channel and noise estimates are provided as an input to step 316. In step 316, distributions of $\{\gamma_{i,j}(k)\}$ and in particular the averages $\overline{\gamma}_j$ are computed from equations 6 and 7 and provided as an input to step 320. Alternatively, distributions of $\{\gamma_{i,j}(k)\}$ and the averages $\overline{\gamma}_j$ may be received from the user terminals via feedback links 119. In step 320, the processor 114 computes $\{\beta_j\}$ from equation 5.

In step 324, stored tables of $MMSE^{-1}$ functions are selected and provided as input to step 326 which computes q and $\{\overline{p}_j\}$ by solving equation 14 by use of Broyden's method, for example.

In step 332, the frame data is transmitted by a transmitter, such as transmitter 116 of FIG. 1, at the calculated power. The process 300 then repeats with the next frame beginning at step 304 again.

While the present invention has been disclosed in a presently preferred context, it will be recognized that the present teachings may be adapted to a variety of contexts consistent with this disclosure and the claims that follow. For example, the MMSE and $MMSE^{-1}$ functions may be computed in real time rather than stored in look-up tables. It will also be appreciated that variations in the particular hardware and software employed are feasible, and to be expected as both evolve with time. Other such modifications and adaptations to suit a particular design application will be apparent to those of ordinary skill in the art. In addition to OFDM, the invention may also be applied to other multiuser set-ups where the role of the frequency tones is played by another orthogonal partition of a certain resource over which an average power constraint like the one in Equation 4 applies. For example, if communication to various users took place by time-multiplexing them on disjoint time intervals over which an average power constraint existed, or by spatially multiplexing them on orthogonal spatial dimensions with an average power constraint, the apparatus and methods claimed by this invention would apply directly.

I claim:

1. An apparatus for allocating transmission power among a plurality of users in an orthogonal frequency division multiplexing (OFDM) wireless communication system comprising:
   a receiver for receiving transmissions and providing channel and noise estimates which fit a zero-mean complex Gaussian random process; and
   a processor for receiving the channel and noise estimates, assigning tones and priorities among the plurality of users, and generating a channel state for each user, wherein the channel state is related to a complex gain value representing a fading state of a corresponding tone divided by a noise estimate for the corresponding tone, and allocating power to tones whose channel state is above a threshold, wherein the threshold is directly proportional to a bandwidth fraction assigned to a corresponding user and inversely proportional to the priority assigned to the corresponding user.

2. The apparatus of claim 1 further comprises:
   a transmitter for transmitting signals to each user at a power level based on the power allocation, wherein the power allocation maximizes the region of simultaneously achievable mutual informations.

3. The apparatus of claim 1 wherein no power is allocated to tones whose channel state is below or equal to the threshold.

4. The apparatus of claim 1 wherein the threshold for the channel state for user j and parameter $\eta$ is $\beta_j/w_j\eta$, wherein $\beta_j$ is the bandwidth fraction and $w_j$ is the priority of user j.

5. The apparatus of claim 4 wherein the parameter $\eta$ is obtained by solving $$\sum_{i=1}^{n_j} \sum_{j=1}^{J} \frac{1}{n\gamma_{i,j}} MMSE_j^{-1}\left(\min\left\{1, \frac{\beta_j\eta}{w_j\gamma_{i,j}}\right\}\right) = P$$

wherein for user j $MMSE_j^{-1}$ is the inverse minimum mean square error, $\gamma_{ij}$ is the channel state of tone i of user j, n is the total number of tones, and nP is the maximum power that can be supplied by a transmitter.

6. The apparatus of claim 5 wherein the power allocated to a tone i for a user j, $p_{i,j}$, is given by $$p_{i,j} = \frac{1}{\gamma_{i,j}} MMSE_j^{-1}\left(\frac{\beta_j \eta}{w_j \gamma_{i,j}}\right) \gamma_{i,j} > \text{threshold}.$$

7. The apparatus of claim 4 wherein the channel state is an average channel state $\bar{\gamma}_j = E[\gamma_{i,j}(k)]$ i=1, ..., $n_j$.

8. The apparatus of claim 4 wherein the parameter η and the power allocated to every tone i for a user j, $\bar{p}_j$, is obtained by solving $$E[\gamma_{i,j}(k)MMSE_j(\bar{p}_j\gamma_{i,j}(k))] = \frac{\beta_j}{w_j}\eta.$$

9. A method for allocating transmission power among a plurality of users in an orthogonal frequency division multiplexing (OFDM) wireless communication system comprising:
receiving channel and noise estimates which fit a zero-mean complex Gaussian random process;
generating a channel state for each user, wherein the channel state is related to a complex gain value representing a fading state of a corresponding tone divided by a noise estimate for the corresponding tone; and
allocating power to tones whose channel state is above a threshold, wherein the threshold is directly proportional to a bandwidth fraction assigned to a corresponding user and inversely proportional to a priority assigned to the corresponding user.

10. The method of claim 9 further comprises:
transmitting signals to each user at a power level based on the power allocation, wherein the power allocation maximizes the region of simultaneously achievable mutual informations.

11. The method of claim 9 further comprises:
allocating zero power to tones whose channel state is below or equal to the threshold.

12. The method of claim 9 wherein the threshold for the channel state for user j and parameter η is $\beta_j/w_j\eta$, wherein $\beta_j$ is the bandwidth fraction and $w_j$ is the priority of user j.

13. The method of claim 12 further comprises:
solving $$\sum_{i=1}^{n_j} \sum_{j=1}^{J} \frac{1}{n\gamma_{i,j}} MMSE_j^{-1}\left(\min\left\{1, \frac{\beta_j\eta}{w_j\gamma_{i,j}}\right\}\right) = P$$

to obtain parameter η, wherein for user j $MMSE_j^{-1}$ is the inverse minimum mean square error, $\gamma_{i,j}$ is the channel state of tone i of user j, n is the number of tones, and nP is the maximum power that can be supplied by a transmitter.

14. The method of claim 13 wherein allocating power further comprises:
allocating power $p_{i,j}$ to a tone i for a user j based on $$\sum_{i=1}^{n_j} \sum_{j=1}^{J} \frac{1}{n\gamma_{i,j}} MMSE_j^{-1}\left(\min\left\{1, \frac{\beta_j\eta}{w_j\gamma_{i,j}}\right\}\right) = P$$

15. The apparatus of claim 12 wherein the channel state is an average channel state $\bar{\gamma}_j = E[\gamma_{i,j}(k)]$ i=1, ..., $n_j$ wherein $\gamma_{i,j}(k)$ is the channel state for tone i user j.

16. The method of claim 12 wherein allocating power further comprises:
allocating power $\bar{p}_j$ allocated to every tone i of user j based on $E[\gamma_{i,j}(k)MMSE_j(\bar{p}_j\gamma_{i,j}(k))]=\beta_j/w_j\eta$ when the average channel state exceeds the threshold.

17. A non-transitory electronic medium storing a computer program, the computer program comprising instructions for allocating transmission power among a plurality of users in an orthogonal frequency division multiplexing (OFDM) wireless communication system, the instructions when executed causing a processor to perform steps comprising:
receiving channel and noise estimates which fit a zero-mean complex Gaussian random process;
generating a channel state for each user, wherein the channel state is related to a complex gain value representing a fading state of a corresponding tone divided by a noise estimate for the corresponding tone; and
allocating power to tones whose channel state is above a threshold, wherein the threshold is directly proportional to a bandwidth fraction assigned to a corresponding user and inversely proportional to a priority assigned to the corresponding user.

18. The non-transitory electronic medium of claim 17 further storing instructions when executed causing a processor to perform a step comprising:
transmitting signals to each user at a power level based on the power allocation, wherein the power allocation maximize the region of simultaneously achievable mutual informations.

19. The non-transitory electronic medium of claim 17 further storing instructions when executed causing a processor to perform steps comprising:
solving $$\sum_{i=1}^{n_j} \sum_{j=1}^{J} \frac{1}{n\gamma_{i,j}} MMSE_j^{-1}\left(\min\left\{1, \frac{\beta_j\eta}{w_j\gamma_{i,j}}\right\}\right) = P$$

to obtain parameter η, wherein, for user j, $MMSE_j^{-1}$ is the inverse minimum mean square error, $\gamma_{i,j}$ is the channel state of tone i of user j, n is the total number of tones, and nP is the maximum power that can be supplied by a transmitter and wherein the threshold for the channel state for user j and parameter η is $$\frac{\beta_j}{w_j}\eta,$$

wherein $\beta_j$ is the bandwidth fraction and $w_j$ is the priority of user j; and
allocating power $p_{i,j}$ to a tone i for a user j based on $$E[\gamma_{i,j}(k)MMSE_j(\bar{p}_j\gamma_{i,j}(k))] = \frac{\beta_j}{w_j}\eta.$$

20. The non-transitory electronic medium of claim 17 further storing instructions when executed causing a processor to perform a step comprising:

allocating power $\bar{p}_j$ allocated to every tone i for user j based on $$E[\gamma_{i,j}(k)MMSE_j(\bar{p}_j\gamma_{i,j}(k))] = \frac{\beta_j}{w_j}\eta$$

when an average channel state exceeds the threshold wherein the channel state is an average channel state $\bar{\gamma}_j = E[\gamma_{i,j}(k)]$ i=1, ..., $n_j$ and $\gamma_{i,j}(k)$ is the channel state for tone i of user j.

* * * * *